United States Patent [19]

Schutte

[11] Patent Number: 5,251,220
[45] Date of Patent: Oct. 5, 1993

[54] METHOD AND APPARATUS FOR ERROR DETECTION AND PROCESSING

[75] Inventor: Mark E. Schutte, Sugar Hill, Ga.

[73] Assignee: Scientific-Atlanta, Inc., Norcross, Ga.

[21] Appl. No.: 619,364

[22] Filed: Nov. 28, 1990

[51] Int. Cl.$^5$ ............................................. G06F 11/00
[52] U.S. Cl. ................................... 371/55; 371/62; 341/94
[58] Field of Search .................... 371/55, 61, 62, 25.1, 371/67.1; 341/94

[56] References Cited

U.S. PATENT DOCUMENTS

| | | | |
|---|---|---|---|
| 3,524,164 | 8/1970 | Cox et al. | 371/55 |
| 3,806,918 | 4/1974 | Cauthron et al. | 341/94 |
| 4,122,441 | 10/1978 | Robinson et al. | 371/61 |
| 4,304,003 | 12/1981 | Kaizawa et al. | 371/62 |
| 4,545,055 | 11/1985 | Patel | 371/55 |
| 4,807,260 | 2/1989 | Solina | 371/55 |
| 4,813,044 | 3/1989 | Kumar et al. | 371/55 |
| 4,839,907 | 6/1989 | Saneski | 371/61 |
| 5,036,460 | 7/1991 | Takahira et al. | 371/61 |

*Primary Examiner*—Robert W. Beausoliel, Jr.
*Assistant Examiner*—Phung My Chung
*Attorney, Agent, or Firm*—William A. Marvin; Frederick W. Powers, III

[57] ABSTRACT

An Off-premises CATV system having an interdiction apparatus includes a remote microprocessor which receives commands and data from the headend over the cable distribution plant. The data is in a modified Manchester format (biphase-M) at 19.2 K baud which is then frequency modulated on a carrier of 108.2 MHz. A receiver detects the base band signal and outputs a serial digital signal to one input port pin of the microprocessor. The microprocessor rejects incorrect messages by measuring the duration between the negative transitions in the data signal. For those negative transitions which do not fall within predetermined windows where data transitions or a start of message character should be, an error is detected and the message is discarded.

10 Claims, 5 Drawing Sheets

FIG. 3
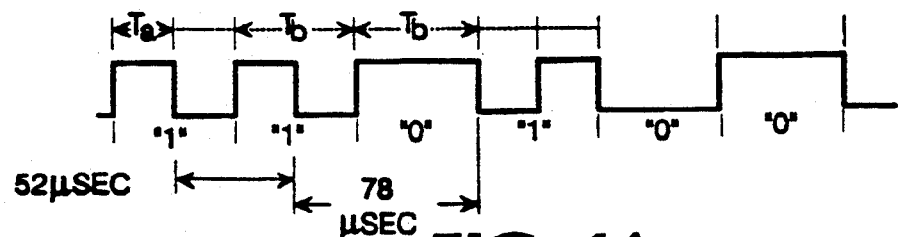
FIG. 4A
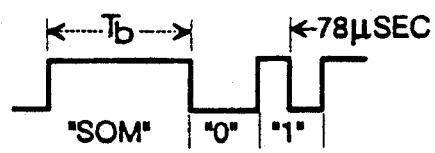
FIG. 4B
$T_a$ = 26.0μS
$T_b$ = 52.0μS
$T_c$ = 208.0μS
$T_d$ = 208.0μS
FIG. 4C
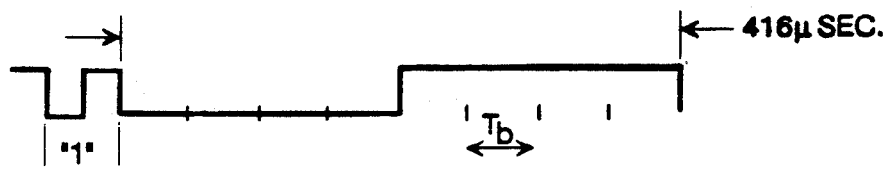
FIG. 4D
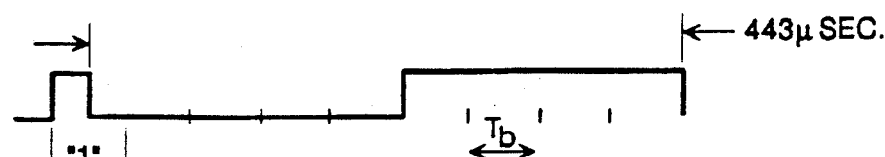
FIG. 4E
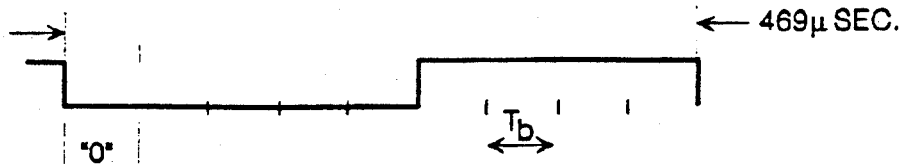
FIG. 4F

METHOD AND APPARATUS FOR ERROR DETECTION AND PROCESSING

FIELD OF THE INVENTION

The invention pertains generally to data error detection and processing for receivers and is more particularly directed to a data receiver with such capabilities included in an offpremises CATV system having interdiction apparatus.

BACKGROUND OF THE INVENTION

In systems which transmit data on a carrier, it is desirable to employ some sort of squelch or muting system to avoid a situation in which the carrier signal has vanished for some reason and the receiver is generating noise. The data supplied from such a receiver may be interpreted by a microprocessor, which also has several other tasks to perform, many of which apply even when data is not being received. If the microprocessor does not have to take its time attempting to interpret noise, a much more efficient system results.

For example, in an off-premises CATV system including a microprocessor, data is transmitted to the off-premises unit via frequency modulated carrier, for example at 108.2 MHz. This off-premises CATV system is more fully disclosed in U.S. Pat. No. 4,912,760 issued Mar. 27, 1990 to West, Jr., et al. and commonly assigned with the present invention. The disclosure of West, Jr., et al. is hereby incorporated by reference herein. A receiver detects the carrier and outputs baseband digital data to the microprocessor over a serial data line. If the carrier is removed, either intentionally or due to a failure, the receiver will generate a digital signal which is noise. This is similar to what is heard when an FM radio is tuned between stations, providing the radio does not automatically mute. If the digital noise is presented to the microprocessor, which is programmed to interpret data among its other chores, several undesirable things could happen. It is possible that the microprocessor will interpret the noise as a legitimate command, and it will do something it is not supposed to, such as disconnect a subscriber improperly. The probability of this circumstance may be reduced, but not eliminated, by proper coding and error checking. Another more probable outcome of the data carrier being removed, is that the microprocessor will be so busy attempting to interpret data which is in error, that it will not have time to perform other programmed chores.

This difficulty has been solved in the past in off-premises CATV system by providing an analog mute or squelch circuit as part of the analog circuits in the data receiver. Typically, a voltage proportional to the carrier signal strength is developed in the receiver which may then be monitored by a threshold detector. When the signal strength, as represented by the voltage, drops below the predefined threshold, the output from the receiver is removed or muted. This works, but has the limitation that the circuits which develop the voltage and which monitor it, are analog circuits, and subject to drift especially over the wide temperature ranges encountered in off-premises apparatus intended to be used outdoors. Further, cost is an important consideration in subscriber circuitry and the elimination of the analog squelch circuits would be beneficial for that reason.

SUMMARY OF THE INVENTION

The invention provides a digital mute during the sampling and decoding of a data signal by a microprocessor. The digital mute eliminates the need for the analog squelch circuits and their consequent problems.

The digital mute operates by monitoring the data for a synchronizing word or sequence of bits (data), which it expects on some sort of regular basis. For example, in a system such as that illustrated in West, Jr., et al. '760 (more fully described hereinafter), a sync word should be received by the microprocessor every 100 ms. The microprocessor will detect this word and take action on the instruction it receives next, if all checking routines are positive. The microprocessor then starts a clock running for 100 mS and looks for the sync word again. If the microprocessor sees the sync word within a reasonable time window, it assumes good data is being received. If it does not see the sync word again at the expected time, the microprocessor determines that it is not receiving good data. The microprocessor is then programmed to go to other tasks, returning only occasionally to check the incoming data for consecutive sync words 100 mS apart. Normally, the microprocessor will return to the data stream and monitor it for a little over 100 mS. If a sync word is received, the microprocessor will wait for another 100 mS later, and if it sees the sync word again the microprocessors will begin acting on the information received. If the microprocessor does not see the sync word, it will go do other tasks for a predetermined time, for example, two seconds.

In this manner, even if the data receiver generates noise which might otherwise keep the microprocessor busy or might occasionally result in improper actions, the microprocessor knows to ignore the data the receiver is putting out. It is then free to carry out other tasks, so long as it occasionally comes back to check the data stream, in case good data has returned.

In a preferred implementation, data is transmitted in the well known Manchester encoded form frequency modulated on a carrier. A start of message (SOM) header is added at regular intervals, which consists of a long period of a low level followed by a long period of a high level. These periods do not constitute legitimate Manchester encoded data, but are interspersed with the data. A data receiver detects the carrier and provides the resulting digital signal to the microprocessor.

The output of the data receiver, which will contain this pattern, is supplied to a counter, preferably but not necessarily in the microprocessor, which is arranged to increment if an edge transition is found. When the counter does increment, indicating either no SOM or an invalid SOM, a timer is set in the microprocessor, such that the microprocessor is free to do other things until the timer times out. The time to timeout is set shorter than the expected duration of the SOM. At this time processing is interrupted while the microprocessor checks the count in the counter. If it is the same as when the timer was started, the microprocessor assumes that a valid SOM is received. If the count has changed, the microprocessor assumes that noise has been received.

These and other features, aspects, and objects of the invention will be more fully understood and better described from a reading of the following detailed description in conjunction with the appended drawings wherein:

BRIEF DESCRIPTION OF THE DRAWINGS

FIG. 3 is a detailed waveform representation of the modified Manchester biphase data signal which is detected by the microprocessor illustrated in FIG. 2;

FIGS. 4A-4F are a detailed timing charts of various bit signals in the data signal illustrated in FIG. 3.

DETAILED DESCRIPTION OF THE PREFERRED EMBODIMENT

Figure 1:
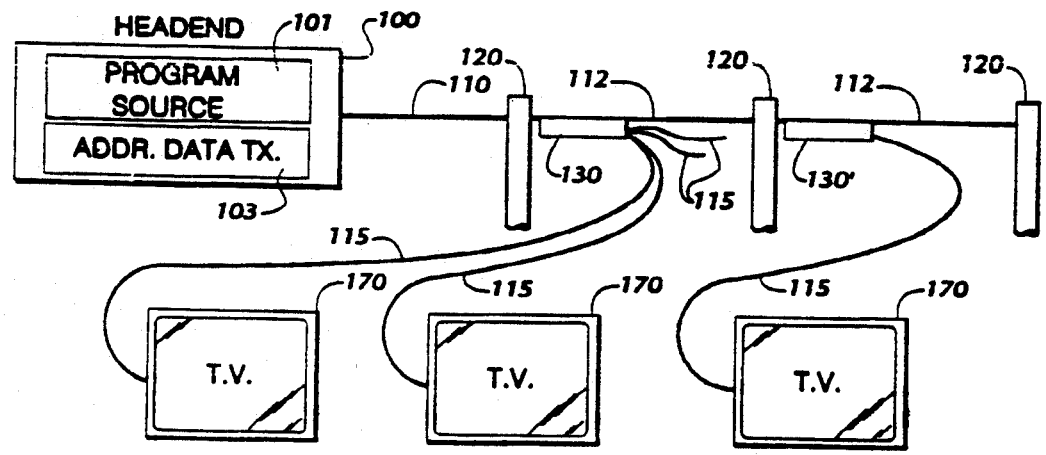
FIG. 1 is a system block diagram of an off-premises CATV system including a data receiver constructed in accordance with the invention.

FIG. 1 is a off-premises CATV system having a headend 100 and a cable distribution plant consisting of trunk cables 110, feeder cables 112, and subscriber drops 115. In general, an interdiction apparatus 130 serving plural subscribers or an interdiction apparatus 130' serving a single subscriber is disposed between the subscriber receiver 170 and the feeder 112. A program source 101 at the headend 100 distributes premium, restricted, and normal television channels in the clear over the cable distribution network. At the interdiction apparatus 130, 130', the premium and restricted channels are jammed with jamming signals to interdict their reception by the subscriber receivers 170. This type of off-premises CATV system is more fully disclosed in West, Jr., et al. '760.

Also, at the headend 100, there is normally an addressable data transmitter 103 for transmitting global commands and data to all subscribers, or local commands and data for reception by a unique subscriber. Such data transmissions may be conducted over a separate data carrier from the cable television spectrum, for example, at 108.2 MHz. Global commands generally take the form of operation codes and data while local communications further comprise the unique address of a particular subscriber.

Figure 2:
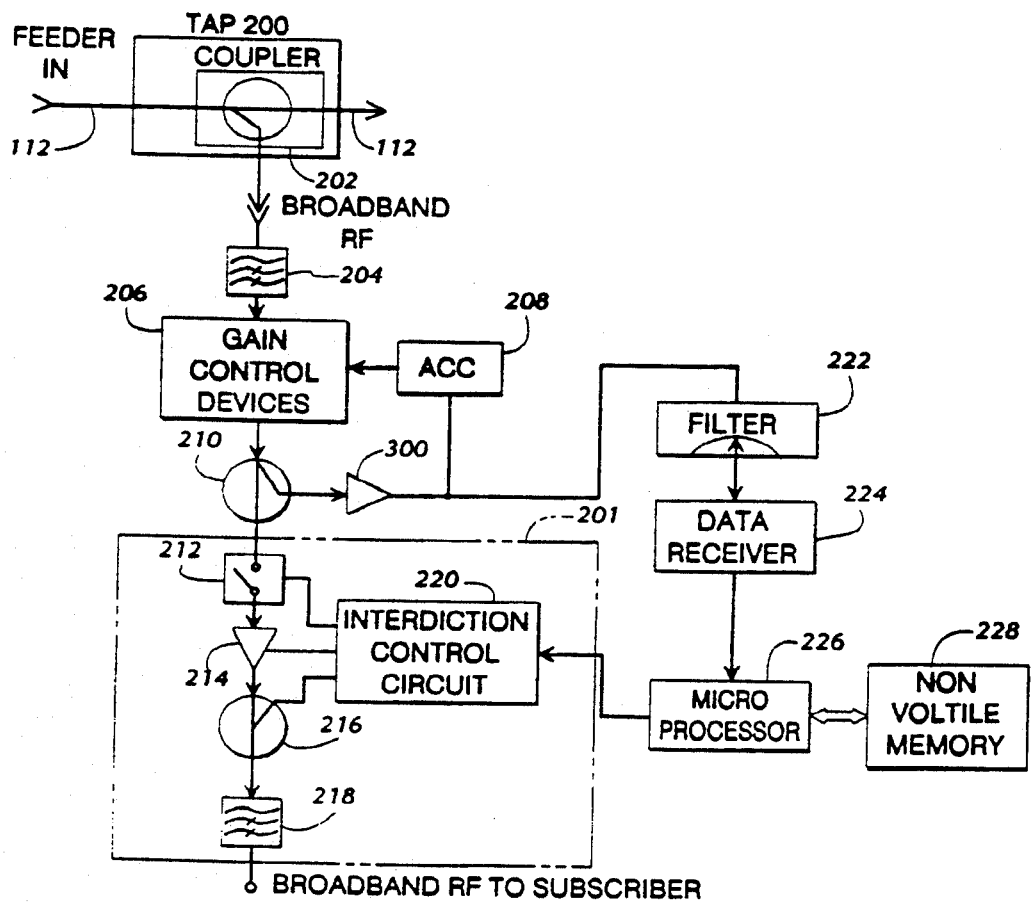
FIG. 2 is a detailed block diagram of the interdiction apparatus illustrated in FIG. 1.

The interdiction apparatus 130 will now be described by means of the block diagram of FIG. 2. For serving at least one, and up to four or more subscribers, interdiction control modules comprising elements 220, 212, 214, 216, and 218 are provided. The remaining circuitry is common to the interdiction apparatus.

At a tap 200, a directional coupler 202 taps into the broadband serving feeder cable 112. A broadband spectrum of CATV signals is thus output to a highpass filter 204. Highpass filter 204 passes a band of frequencies comprising at least the data carrier frequency and the CATV channel spectrum. The CATV spectrum presently comprises a frequency band from about 54 MHz. to 550 MHz. and the data carrier is at 108.2 MHz.

The common circuitry comprises a series of gain controlled devices 206, directional coupler 210, amplifier 300, and an automatic compensation control 208. The automatic compensation control includes an automatic gain control which varies the amplitude of the broadband television signal by controlling the attenuation of variable gain devices 206 and an automatic slope control which varies the amplitude of the broadband television signal with respect to frequency by controlling the variable gain devices 206.

Also connected to directional coupler 210 and amplifier 300 is a data receiver 224 for receiving data from the addressable data transmitter 103 located at headend 100. Data receiver 224 receives data transmitted, for example, over a data carrier of 108.2 megahertz and provides biphase data to a microprocessor 226. In accordance with an established protocol, such data may be in the form of an operation code, a subscriber unique address and associated data. The data is provided to the microprocessor 226 for further interpretation in accordance with a built-in algorithm. Microprocessor 226 is most efficiently chosen to alleviate as many responsibilities from any other controllers provided for an individual interdiction control module and so is most conveniently an eight bit microprocessor having eight kilobytes of internal code such as a Motorola 68HC05C8.

Received data may be stored in nonvolatile memory 228 by microprocessor 226. Data may be temporarily stored in memory 226 or more permanently stored and subsequently downloaded when needed to a interdiction control module via a serial interface bus connecting microprocessor 226 with the separate microprocessors associated with each provided interdiction control module.

Variable gain devices 206 regulate the received broadband of picture carriers to a reference level and provide frequency dependent compensation while the microprocessor 226 controls the jamming carrier level outputs of associated interdiction control units within a prescribed range.

Radio frequency splitter 210 provides the compensated broadband radio frequency signals comprising at least the cable television spectrum separately to each interdiction control module that is provided.

The interdiction control circuit 220 controls a subscriber disconnect switch 212, a subscriber amplifier 214, and a directional coupler 216 to perform the interdiction function. The disconnect switch 212 can be used to remove the entire service from a subscriber. The amplifier 214 can be used for final adjustment of the broadband signal before interdiction is applied by introducing jamming signals into the spectrum through coupler 216. The signal is then filtered by high pass filter 218 before being delivered to the subscriber.

Data is continuously sent to the receiver by the addressable transmitter 103. The interdiction apparatus control transactions are received by the receiver from the host control computer. The transmitter 103 converts the input transactions into a format required by the interdiction control and transmits the transactions on a unique data carrier frequency over the cable. Each transaction transmitted by the addressable transmitter 103 is output as a FSK modulated biphase coded data stream at a data rate of 19,200 baud on an output carrier of 108.2 MHz.

The modulated RF carrier is fed into the data receiver 224 of the interdiction apparatus 130 which produces the baseband data required by the interdiction apparatus. The baseband data is fed into an I/0 pin (port) of the microprocessor 226 for decoding and error checking. The data reception port of the microprocessor is equipped to detect the change in the data stream from a high level to a low level (negative going transition) or from a low level to a high level (positive going transition) and provide a set of interrupts based on the time of the transition. Further associated with the port hardware in the microprocessor is a free running counter which can be used in conjunction with the interrupts. The counter is incremented periodically, for example, every two microseconds in the present implementation. Two of the interrupts will be discussed and termed the timer capture interrupt (TCAP) and the timer compare interrupt (TCOMP). The TCAP, when armed, provides an interrupt when an edge is detected and stores the value of the free running counter in a register so that the time of the edge can be determined when the interrupt is serviced. The TCOMP, when armed, provides an interrupt when the free running counter equals the value of a parameter which is loaded into a register. This flexible interrupt structure is used to advantage by the invention, but it is evident that the invention is not dependent upon it or limited thereto. The functions performed by the interrupt structure are easily performed in software or by other hardware.

The data stream as more fully illustrated in FIG. 3 is modified Manchester (biphase-M) encoded. Manchester encoding is a self-clocking scheme that changes from a 0 to a 1 or a 1 to a 0 at every bit boundary, with an additional change in the middle of a bit duration if a 1 is represented. A typical data message is shown in the illustration. The format is that each data message starts with a start of message (SOM) character followed by data of either 8 bits in any multiple up to 128 in the modified Manchester encoding. At 19,200 baud, each bit time will be 52.8 $\mu$seconds. Each of the messages is prefixed with the start of message (SOM) field which is low for 4 bit times and then high for 4 bit times. The first bit of a transaction always begins with a high to low transition.

FIGS. 4a–4f are an expanded waveform drawings of some parts of the bit stream in FIG. 3. From FIGS. 4a–4f, it is seen that there are two basic time periods in the encoded data, i.e., the time period Tb which is a full bit duration of 52 $\mu$sec. and the time period Ta for 1 level changes between bit times of 26 $\mu$sec. The SOM high level, Tc and the SOM low level, Td are a multiple ($\times$4) of the basic bit duration, 208 $\mu$sec.

If times are measured between similar transitions, a decoding algorithm may be formed to decode the data and reject the noise.

For example, if the time between sequential falling edges of the biphase data is measured, the following table shows that there are only six distinct time periods contained in the data:

| TIME | DATA BIT |
| --- | --- |
| 52 $\mu$sec. | 1 |
| 78 $\mu$sec. | 01 or 0 |
| 104 $\mu$sec. | 00 |
| 416 $\mu$sec. | SOM |
| 443 $\mu$sec | 1 followed by SOM |
| 469 $\mu$sec | 0 followed by SOM |

The first 78 $\mu$sec. time period received after an SOM is interpreted as 01. The next 78 $\mu$sec. time period after 1 is received is decoded as a 0. Thereafter, the bit patterns continue to toggle as the 78 $\mu$sec. times are received depending on whether a 1 or 0 proceeds them.

Figure 5:
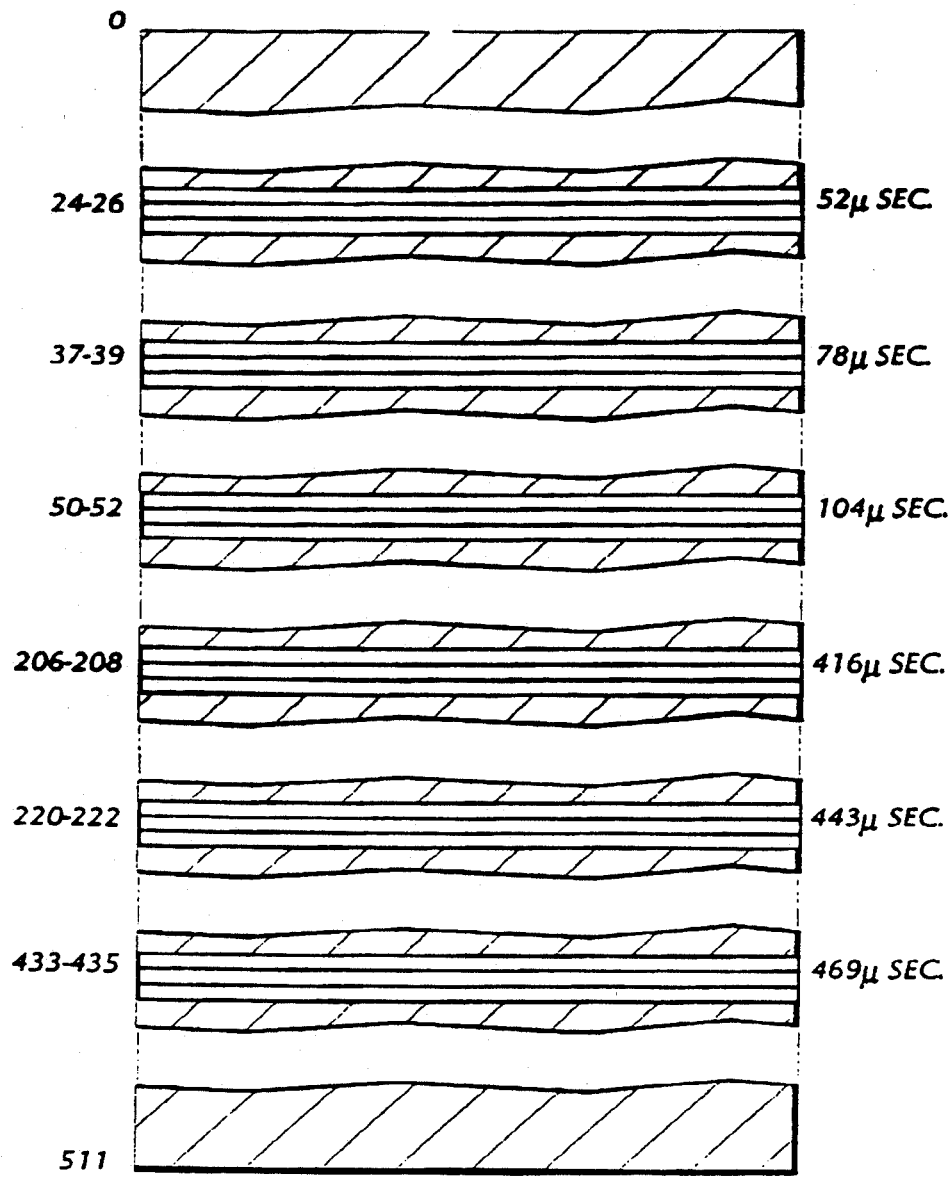
FIG. 5 is a pictorial representation of the count values of a counter for valid transitions of the data signal illustrated in FIG. 3.

Windows can be created around these time slots to determine whether the incoming signal is actually data or is noise. This hysteresis allows for tolerances in the data received due to noise and frequency deviation. However, transitions which fall outside of these windows are noise and should cause the message rejection or correction algorithms to be employed. Because of the manner in which the microprocessor is implemented, an advantageous digital windowing technique can be used. However, the technique is not limited to the particular hardware disclosed and can be used generally in any digital system. The free running counter, as was mentioned previously, is incremented every 2 $\mu$sec. and, for the purposes of the invention, has 512 states or counts 0–511 as seen in FIG. 5. This means that there are 1024 $\mu$sec. in a full 511 count, enough to include all the unique time periods of the data stream. Therefore, if the delta times between transition (negative in the example) of the data stream are taken, six unique counts of the free running counter oscillator will be defined, i.e., 25, 38, 51, 207, 221, and 434, which correspond to the unique time periods 52 $\mu$sec., 78 $\mu$sec., 104 $\mu$sec., 416 $\mu$sec., 443 $\mu$sec., and 449 $\mu$sec., respectively. Windowing or hysteresis can be added by extending the count $\pm 1$ count, 24–26, 37–39, 50–52, 206–208, 220–222, and 433–435, respectively. The technique thus defines 18 unique states of the counter which can be data. A delta timer or counter state representing any other duration is noise and can be easily rejected.

Figure 6A:
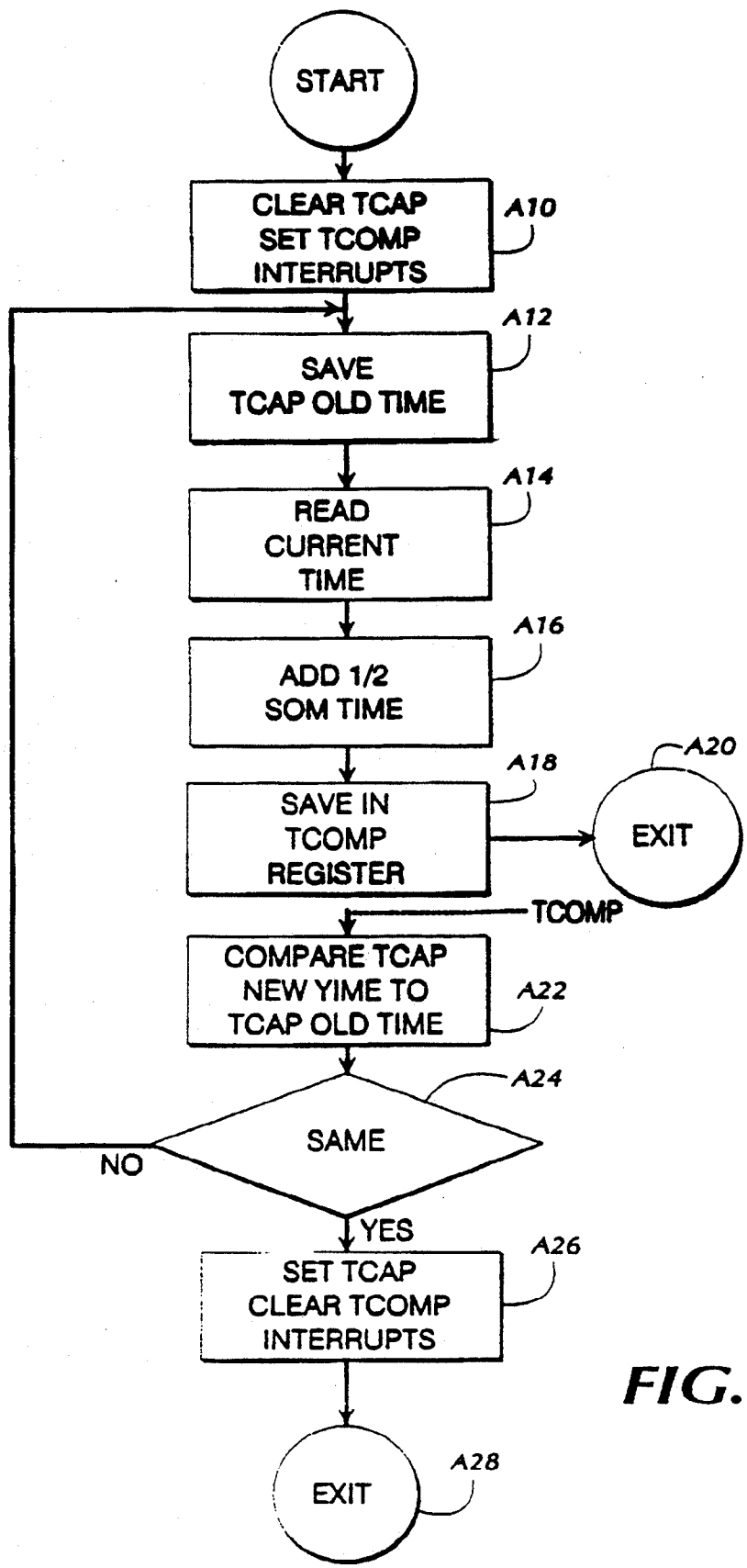
FIG. 6A and 6B are a detailed flow chart of the software decoding and error detecting routine of the microprocessor illustrated in FIG. 2.
Figure 6B:
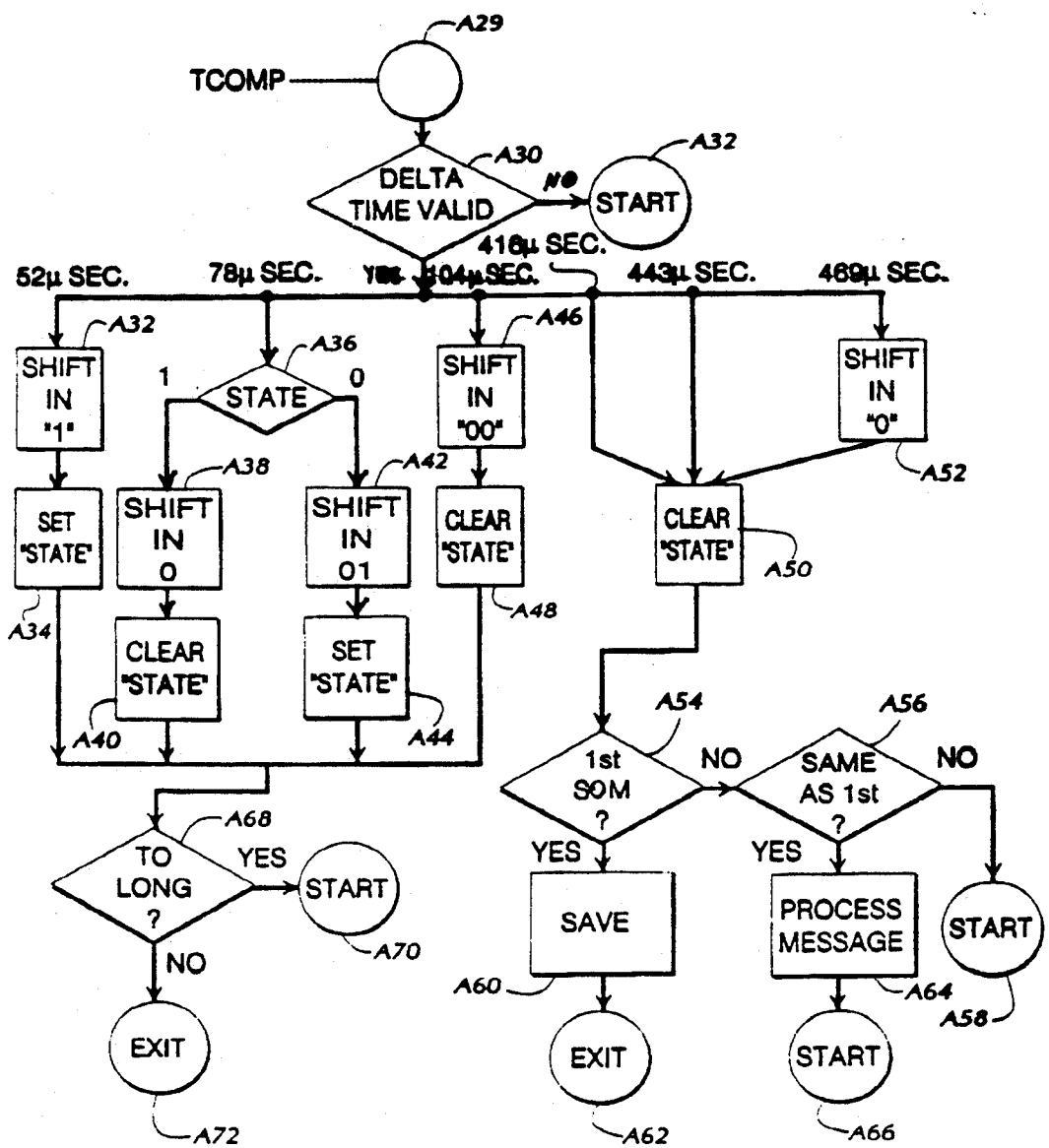

FIGS. 6A and 6B are a detailed flow chart of the software incorporated in microprocessor 226 which implements the digital mute function. The software routine for data decoding and digital muting begins in block A10 where the TCAP interrupt is cleared and the TCOMP interrupt is set. Next the capture time of the last transition is saved in block A12 and the current time is read in block A14. On half of the SOM time, 204 $\mu$sec. is added to the current time in block A16 and the result is stored in the TCOMP register in block A18. The microprocessor then exits the routine to do other processing with the TCOMP interrupt armed. When the TCOMP interrupt occurs it is handled by a transition to block A27 where the counter is checked to determine the time of the last transition. If they are the same, as tested for in block A24, then a clean SOM has been detected and the message which follows can be decoded. If they are not the same then a transition after the beginning of the SOM occurred indicating that the message is probably noisy or is just noise. In this instance, the routine will return to block A12 and wait for a clean SOM. The routine thus performs the first part of the digital mute function where the microprocessor is freed from trying to decode a noisy data line. The TCOMP interrupt will allow the microprocessor to return periodically to the data to determine if the noise has cleared up without wasting much processing time.

Once a clear message is found the routine, in block A26, clears the TCOMP interrupt and sets the TCAP interrupt and then exits in block A28. This action allows the microprocessor to process other routines while waiting for the next delta time between transitions to be determined. A TCAP interrupt will cause the routine to handle the message in block A30 where is determined what the detected delta time between negative going transitions is. The state of the counter is checked against the 18 allowed states by the technique described earlier and, if appropriate, the detected time period is handled by the decoding routines of blocks A32–A50.

If the state of the counter is a nonallowed state, then the message is noisy and the routine returns to the starting point through block A32. A valid delta time is processed by shifting in the detected bit in the decoding routines which end at block A68 or A54. If more bits are to be determined the routine determines if the message is too long, (exceeds 128 bits) in block A68 before continuing. If it is too long, an error has been made and the routine will discard the bit stream to this point by exiting to the starting point to look for a clean SOM character. If the message length has not been exceeded, the routine exits so the microprocessor can continue other routines while it waits for the next TCAP interrupt.

When the end of a message is detected by decoding the following SOM character, the routine in block A54 determines whether this is the first message. If it is, then the message is saved and the routine exits, but stays in the decoding mode with the TCAP interrupt armed. The microprocessor can then perform other tasks until the next TCAP interrupt. At the time a second valid message is decoded, block A56 determines if it is the same as the first. If it matches, then the microprocessor will take the time to process it in block A62 before returning to the starting point in block A66. If the two messages are not the same, then an error has been made in the decoding and both are discarded before returning to the starting point in block A58.

While a preferred embodiment of the invention has been shown and described, it will be obvious to those skilled in the art that various modifications and alterations can be made thereto without departing from the spirit and scope of the invention as defined in the appended claims.

What is claimed is:

1. A method of detecting errors in a modified Manchester digital data stream of two levels having transitions between the levels, said method comprising the steps of:
   sensing level transitions of one particular direction in the digital data stream;
   measuring the amount of time between consecutive level transitions of said one particular direction; and
   comparing the measured amount of time with a plurality of predetermined data transition times, said predetermined data transition times corresponding to the durations between valid level transitions of said one particular direction in said digital data stream, and detecting a data error if said measured amount of time is not substantially equivalent to one of said predetermined data transition times.

2. A method as set forth in claim 1 further comprising the steps of:
   providing said predetermined data transition times as windows of a predetermined duration.

3. A method as set forth in claim 2 wherein:
   said level transitions are positive going transitions.

4. A method as set forth in claim 2 wherein:
   said level transitions are negative going transitions.

5. A method as set forth in claim 4 wherein:
   said digital data stream is encoded at 19.2 k baud.

6. A method as set forth in claim 5 wherein:
   said predetermined data transition times are 52, 78, and 104 $\mu$sec.

7. A method as set forth in claim 6:
   wherein said digital data stream includes a start of message character of four bit times of one level followed by four bit times of the other level; and
   said predetermined data transition times also include 416, 443 and 469 $\mu$sec.

8. A method as set forth in claim 1 which further includes the step of:
   discarding at least part of the data contained in the digital data stream if a data error is detected.

9. A method for error processing of a digital data stream of two levels having transitions between the levels with a microprocessor having a counter and memory, said method comprising the following steps:
   detecting the times at which level transitions occur in the digital data stream;
   incrementing the counter when said level transitions occur;
   storing the value contained in said counter in the memory;
   adding a value which corresponds to the current time to a value which corresponds to a predetermined amount of time to obtain a resultant value;
   storing said resultant value in the memory;
   processing the digital data stream until said resultant value equals a value which corresponds to the new current time;
   comparing the stored value of the counter with the current value of said counter when said value which corresponds to said new current time equals said resultant value;
   performing a digital mute function on the digital data stream if said stored value of the counter does not equal the current value of said counter; and
   decoding the digital data stream if said stored value of said counter equals said current value of said counter.

10. A method for error processing of a digital data stream according to claim 9 wherein the step of decoding the digital data stream includes the steps of:
    determining whether level transitions in a particular direction data stream occur within a plurality of predetermined windows, each of aid windows corresponding to particular valid data times;
    decoding the digital data stream, in accordance with the predetermined windows, if each of said level transitions falls within the predetermined windows; and
    muting said digital data stream if one of said level transitions does not fall within the predetermined windows.

* * * * *